United States Patent
Asahi et al.

(10) Patent No.: US 6,204,441 B1
(45) Date of Patent: Mar. 20, 2001

(54) METHOD AND APPARATUS FOR EFFECTIVELY DISPLAYING MUSICAL INFORMATION WITH VISUAL DISPLAY

(75) Inventors: Yasuhiko Asahi; Akira Tozuka, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/276,418

(22) Filed: Mar. 25, 1999

(30) Foreign Application Priority Data

Apr. 9, 1998 (JP) ................................................. 10-097571

(51) Int. Cl.⁷ ................................................. G09B 15/00
(52) U.S. Cl. ....................... 84/470 R; 84/477 R; 84/478; 84/484; 84/485 R
(58) Field of Search .............................. 84/470 R, 477 R, 84/478, 483.1, 483.2, 484, 485 R

(56) References Cited

U.S. PATENT DOCUMENTS

| 3,978,757 | * | 9/1976 | Johnson, Jr. et al. | 84/485 R |
| 5,153,829 | * | 10/1992 | Furuya et al. | 84/477 R |
| 5,392,682 | * | 2/1995 | McCartney-Hoy | 84/470 R |
| 5,544,562 | * | 8/1996 | Jeon | 84/470 R |

* cited by examiner

*Primary Examiner*—Jeffrey Donels
(74) *Attorney, Agent, or Firm*—Morrison & Foerster

(57) ABSTRACT

An electronic musical apparatus for effectively displaying musical information such as notes and beats is configured using a keyboard, a visual display (e.g., liquid crystal display) and a storage device. A keyboard pattern, a bass staff and a treble staff are displayed on a screen of the visual display. Herein, the keyboard pattern is displayed at a lower base area of the screen while the bass staff is displayed at a lower left area of the screen, and the treble staff is displayed at an upper right area of the screen. In addition, a right end of the bass staff and a left end of the treble staff are located approximately in proximity to a center of the keyboard pattern which corresponds to a key of middle C note in a horizontal direction on the screen. Based on performance data stored in the storage device, keys of the keyboard pattern are respectively displayed to show a progression of notes of a tune. The notes of the tune are sequentially displayed on the bass staff and treble staff, wherein the notes are displayed in accordance with note display positions which are disposed in a direction from the lower left to the upper right on the screen. Further, timings of beats of the tune are displayed using images of hands which are displayed at a predetermined area on the screen. For example, the electronic musical apparatus displays an image of clapping hands and an image of opening hands alternatively.

16 Claims, 12 Drawing Sheets

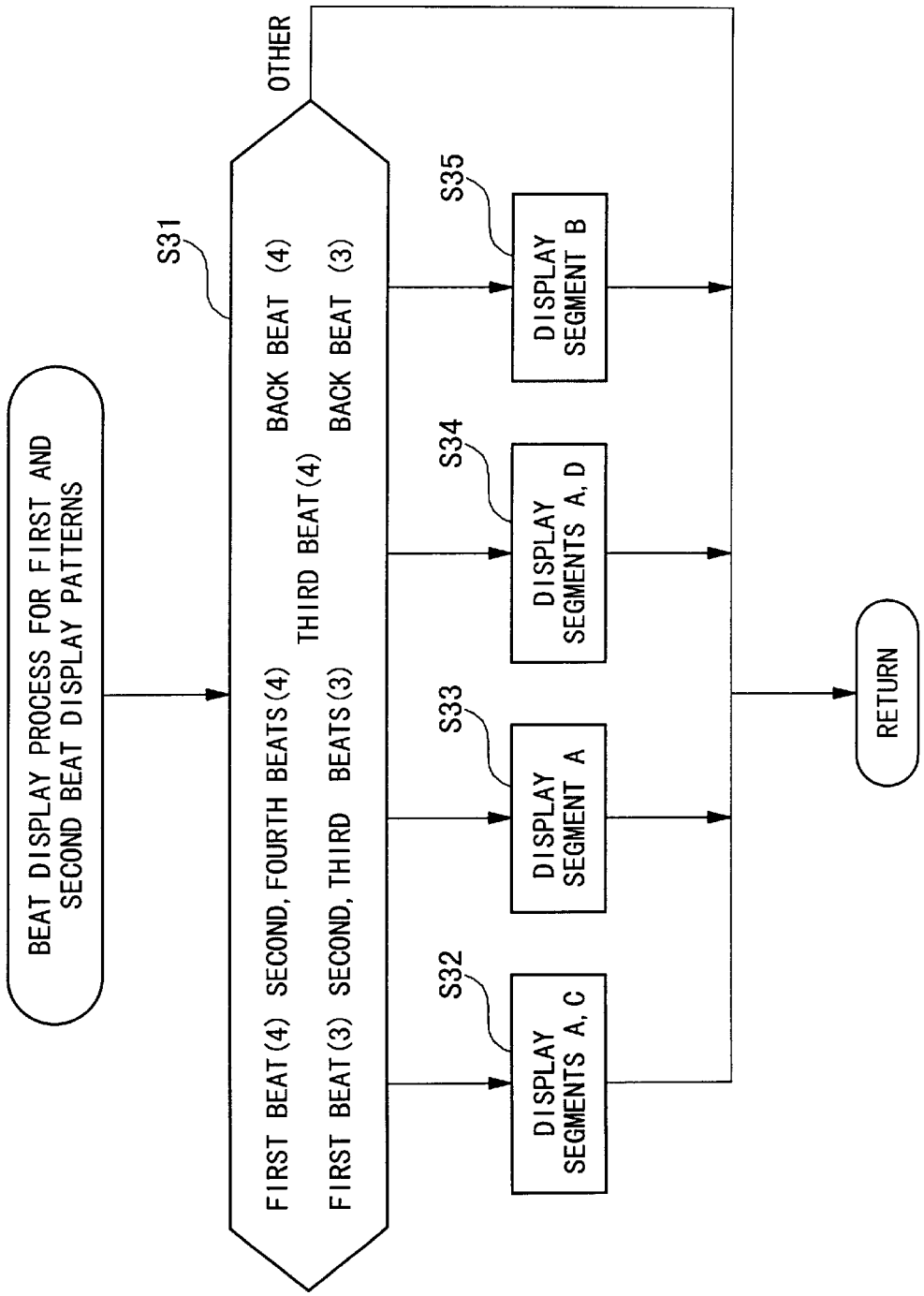

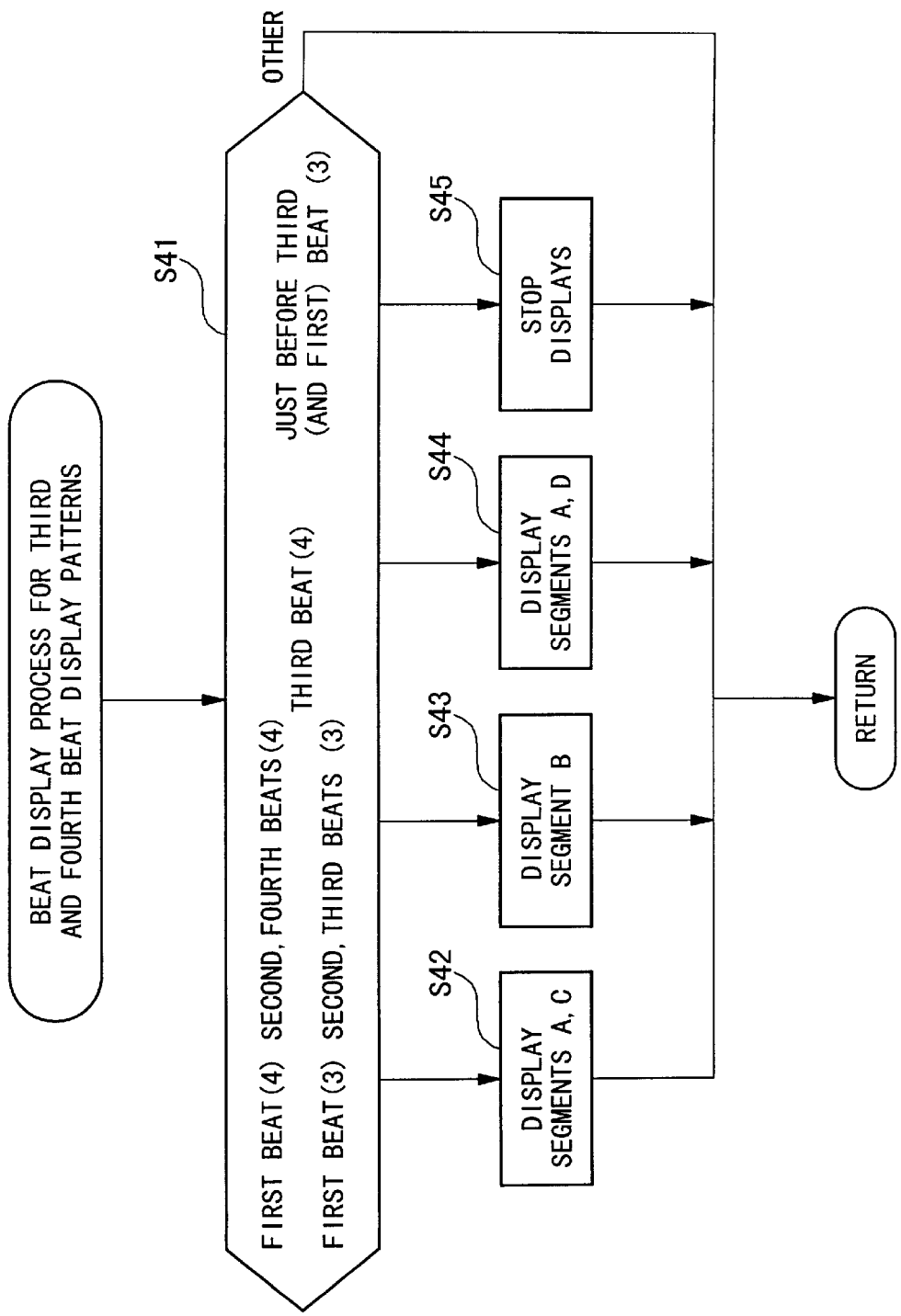

METHOD AND APPARATUS FOR EFFECTIVELY DISPLAYING MUSICAL INFORMATION WITH VISUAL DISPLAY

BACKGROUND OF THE INVENTION

1. Field of the Invention

This invention generally relates to methods and apparatuses for effectively displaying musical information such as notes and beats with visual displays. Particularly, this invention relates to electronic musical apparatuses for visually displaying musical notes, beats and tempos, such as electronic musical instruments as well as personal computers and game devices that run music software programs, for example. In addition, this invention also relates to machine-readable media storing programs that cause computers to visually display the musical information with the visual displays.

2. Description of the Related Art

Conventionally, the electronic musical apparatuses such as the electronic musical instruments and music training machines are designed to have functions of musical note/beat display methods. According to the conventional musical note display method, the electronic musical apparatuses are equipped with visual displays that display notes on staffs (or staves) to designate pitches or keys which are sequentially depressed in response to a progress of a tune to be played. Some electronic musical apparatuses, for example, are equipped with visual displays that display two kinds of staffs, i.e., a low-pitch staff and a high-pitch staff, which will be referred to as a bass staff and a treble staff respectively. Herein, notes are displayed in a slant-arrangement manner on the base staff and treble staff respectively in such a way that they are arranged at note display positions disposed in a direction from the lower left to the upper right of the visual display.

According to the conventional musical beat display method, the electronic musical apparatus uses a single LED (i.e., Light-Emitting Diode) to display beats (or timings of beats) in progress of the tune to be played. Herein, the LED is turned on at the timing of the beat. To cope with a shift of the measure of the tune, the LED is lighted in a different manner (such as different brightness and different color) for display of a first beat of the measure as compared with other beats of the measure. Or, the electronic musical apparatus is equipped with multiple indicators, which are arranged in line. Herein, the indicators are sequentially turned on at the timings of the beats.

In the musical notation, for example, the piano score is written in such a way that both of the bass staff and treble staff have the same length in left-right directions. The conventional electronic musical apparatuses are used to employ such notation in display of notes on the staffs. If the electronic musical apparatus employs such notation in display of staffs, it may succeed to somewhat actualize a visual display simulating an image of a real musical score. In general, it is demanded that the visual display have a capability to display a relatively large amount of information. However, the notation of the piano score is disadvantageous in effective use of the area for the visual display of the electronic musical apparatus. That is, the note display positions are normally arranged in the slantarrangement manner corresponding to the direction from the lower left to the upper right of the visual display, so the notes are not displayed on a right half portion of the bass staff and a left half portion of the treble staff respectively. In other words, those portions merely display the staffs each consisting of five lines or so.

According to the aforementioned musical beat display method, the beats are designated using points of light, which cause some problems as follows:

That is, the users of the electronic musical apparatuses have somewhat mechanical feelings and uninteresting feelings in watching the display of the beats using the points of light. In addition, the beginners and children have difficulties in understanding the functions of the LEDs which are turned on to designate the timings of the beats respectively.

For this reason, even if the engineers succeed to secure a relatively broad display area in the visual display of the electronic musical apparatus, it is difficult to effectively use such a broad display area by the conventional musical beat display method. In other words, the conventional musical beat display method cannot solve the aforementioned problems by merely providing the LEDs to actualize the points of light for designation of the beats.

The paper of Japanese Utility-Model Application, Publication No. Sho 51-121662 discloses a utility model realizing a music score reading board (e.g., music stand), which is designed to merely display the bass staff and treble staff in connection with the keys of the keyboard. However, such a utility model does not provide an effective way for displaying notes, beats and tempos. That is, the utility model is incapable of effectively using open areas such as the right side of the bass staff and the left side of the treble staff.

Some electronic musical instruments are designed to have a capability of displaying beats by flashing light or some images on the screens thereof. However, such electronic musical instruments are designed to have a capability of displaying a selected music element (e.g., beats) using a single segment because of the limited display areas thereof. So, they require a large display space or a number of display areas to simultaneously display multiple music elements such as the notes, beats and tempos, for example.

SUMMARY OF THE INVENTION

It is an object of the invention to provide a method and apparatus for effectively displaying musical information such as notes and beats with a visual display, wherein display areas are arranged and used in an effective manner on a screen of an electronic musical apparatus and music training machine, for example.

According to one aspect of the invention, there is provided an electronic musical apparatus for effectively displaying musical information such as notes and beats, which is configured using a keyboard, a visual display (e.g., liquid crystal display) and a storage device. The visual display employs an effective and efficient way for a display layout using a keyboard pattern representing an image of the keyboard as well as a bass staff and a treble staff on a screen thereof. Herein, the keyboard pattern consisting of white keys and black keys is displayed at a lower base area of the screen while the bass staff is displayed at a lower left area of the screen, and the treble staff is displayed at an upper right area of the screen. In addition, a right end of the bass staff and a left end of the treble staff are located approximately in proximity to a center of the keyboard pattern which corresponds to a key of middle C note in a horizontal direction on the screen.

Based on performance data stored in the storage device, the white keys and/or black keys of the keyboard pattern are respectively displayed to show a progression of notes of a tune. The notes of the tune are sequentially displayed on the bass staff and treble staff, wherein the notes are displayed in accordance with note display positions which are disposed from the lower left to the upper right on the screen to conform with the bass staff and the treble staff respectively. Further, timings of beats of the tune are displayed using images of hands which are displayed at a predetermined area on the screen. For example, the electronic musical apparatus displays an image of clapping hands and an image of opening hands alternatively.

BRIEF DESCRIPTION OF THE DRAWINGS

These and other objects, aspects and embodiment of the present invention will be described in more detail with reference to the following drawing figures, of which:

FIG. 11 is a flowchart showing a beat display process for the first and second beat display patterns; and FIG. 12 is a flowchart showing a beat display process for the third and fourth beat display patterns.

DESCRIPTION OF THE PREFERRED EMBODIMENT

This invention will be described in further detail by way of examples with reference to the accompanying drawings.

Figure 8:
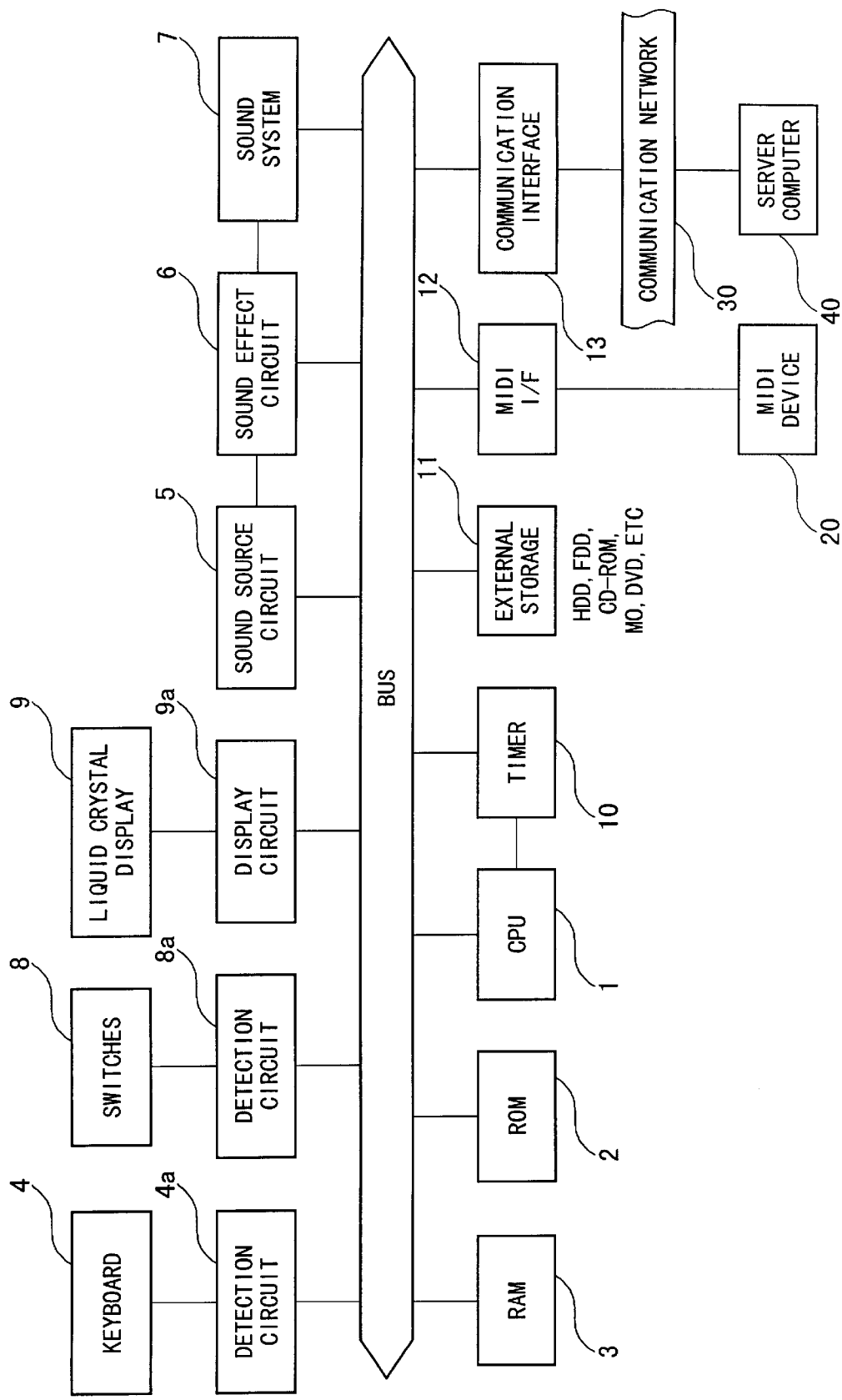
FIG. 8 is a block diagram showing a system configuration for an electronic musical apparatus which is linked with a communication network and which employs a musical note display method and a musical beat display method in accordance with embodiment of the invention.

FIG. 8 is a block diagram showing a system configuration for an electronic musical apparatus which is linked with a communication network or else. Herein, the electronic musical apparatus employs a musical note display method and a musical beat display method in accordance with the embodiment of the invention. In FIG. 8, a CPU 1 performs an overall control on the electronic musical apparatus by running control programs stored in a ROM 2 and by using working areas of a RAM 3. At a keyboard performance mode, the CPU 1 inputs note numbers, key-on signals and velocities produced by a keyboard 4 via a detection circuit 4a. So, the CPU 1 performs a tone-generation process and/or a muting process by setting the note numbers, velocities and note-on/off events to a sound source circuit 5. The sound source circuit 5 generates musical tone signals. The musical tone signals are supplied to a sound effect circuit 6, in which a variety of sound effects are imparted to the musical tone signals. Thus, a sound system 7 produces musical tones corresponding to the sound-effect-imparted musical tone signals. At an automatic performance mode, the CPU 1 reads note numbers, velocities and note-on/off events from automatic performance data stored in the RAM 3. Then, the CPU 1 sets them to the sound source circuit 5 to perform the tone-generation process and/or muting process.

A switch unit 8 containing switches are arranged on an operation panel of the electronic musical apparatus. The CPU 1 inputs switching data of the switch unit 8 via a detection circuit 8a. So, the CPU 1 performs a variety of processes in response to switch operations. As the switches of the switch unit 8, there are provided tone-color selection switches, start/stop switches for automatic performance, tune selection switches for selecting performance data, tempo setting switches and other switches, for example.

A liquid crystal display 9 is basically constructed by a liquid crystal panel and a reflection plate. Herein, segments having prescribed shapes are formed using transparent electrodes in the liquid crystal panel, while the reflection plate is attached to a back side of the liquid crystal panel. Under the control of the CPU 1, a display circuit 9a applies electric voltage selectively to each of the segments, so that the liquid crystal display 9 is capable of visually displaying musical information such as notes and beats.

A timer 10 generates a clock signal consisting of clock pulses in response to resolution of tempo information and performance data which are set by the CPU 1. Based on the clock signal, the CPU 1 performs an interrupt process to control automatic performance. Thus, the CPU 1 reads automatic performance data presently selected from the RAM 3 to perform the tone-generation process and/or muting process with respect to the automatic performance. In addition, the CPU 1 performs a note display process in response to pitches of musical tones to be generated and a beat display process in response to a progress of a tune to be played.

An external storage device 11 is configured by a hard-disk drive (HDD), a floppy-disk drive (FDD), a CD-ROM drive, a magneto-optic disk (MO) drive, a digital video disk (DVD) drive or a digital multipurpose disk drive, for example. Therefore, the external storage device 11 can be used to input and store a variety of data such as the automatic performance data. A MIDI interface (or MIDI I/F, where "MIDI" is an abbreviation for "Musical Instrument Digital Interface") 12 performs data transfer of MIDI data such as the automatic performance data between the electronic musical instrument and a MIDI device 20. In addition, a communication interface 13 is linked with a communication network 30 to receive communication of data such as the automatic performance data from a server computer 40. The automatic performance data given from the external storage unit 11 and the MIDI interface 12 are stored in prescribed areas of the RAM 3. So, the electronic musical apparatus performs an automatic performance process based on the automatic performance data. Incidentally, the electronic musical apparatus (or CPU 1) is capable of inputting the automatic performance data in real time from the keyboard 4 which is performed by a user. Using a so-called step-record function, the electronic musical apparatus is capable of sequentially inputting musical tone data one by one in response to manipulation of the keyboard 4 and operations of the switches, for example.

Figure 2:
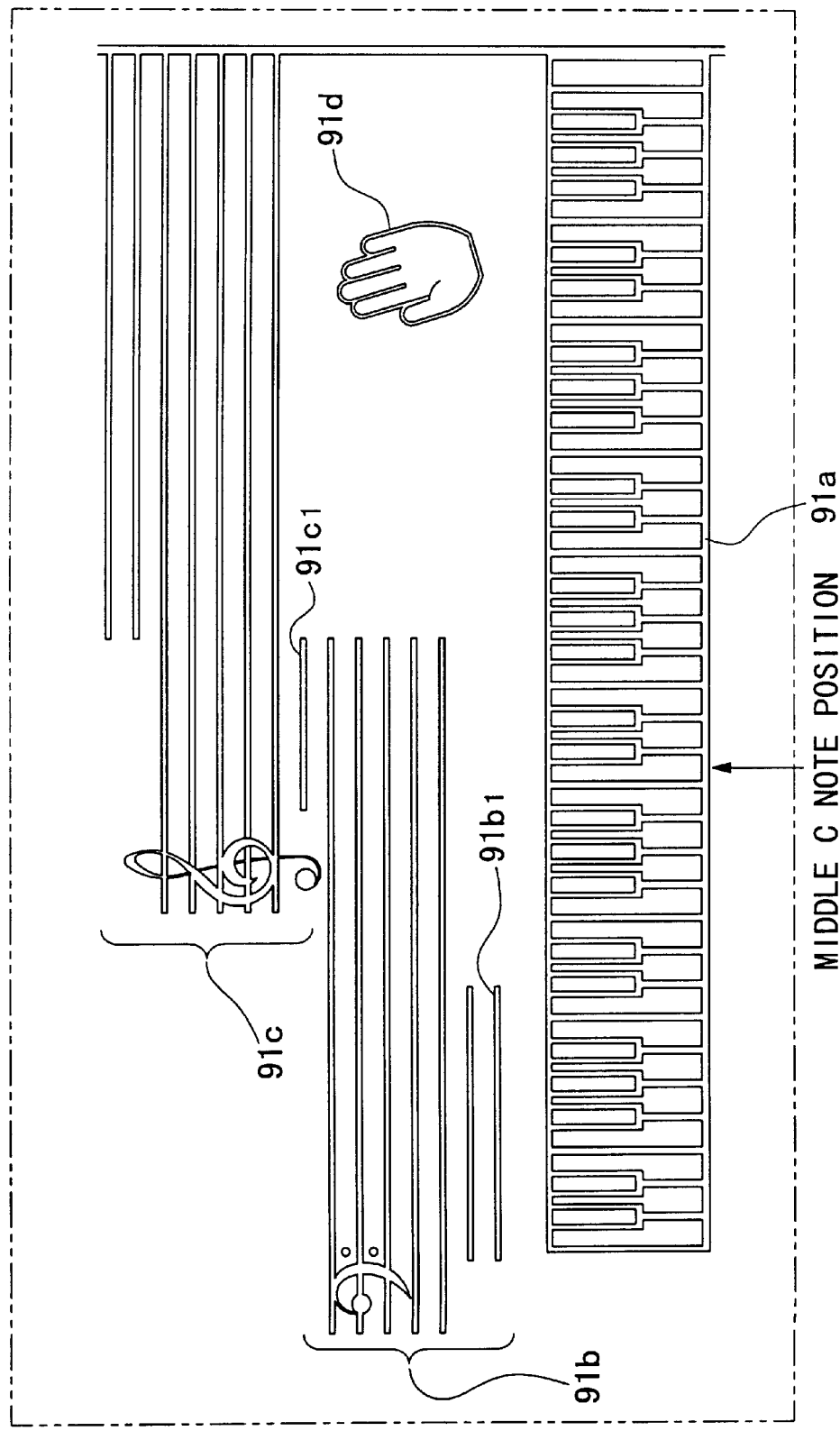
FIG. 2 is a schematic diagram showing an example of printed patterns on a reflection plate of the liquid crystal display.

FIG. 2 shows an example of printed patterns of the reflection plate of the crystal liquid display 9. Herein, a reference symbol "91a" designates a keyboard print pattern diagrammatically showing an image of the keyboard 4, wherein boundary lines for white keys and black keys are printed. In addition, "91b" designates a printed pattern showing a bass staff. A left end of the bass staff 91b, at which a sign of F clef is printed, is positioned leftward from a left end of the keyboard print pattern 91a, while a right end is at a position which is rightward from a middle C position of the keyboard print pattern 91a by a length corresponding to several notes. Further, "91c" designates a printed pattern showing a treble staff. A left end of the treble staff 91c, at which a sign of G clef is printed, is positioned leftward from the middle C position of the keyboard print pattern 91a, while a right end coincides with a right end of the keyboard print pattern 91a. Furthermore, a beat display print pattern 91d diagrammatically showing an image of a palm of a left hand is printed in an open area existing between the treble staff 91c and the keyboard print pattern 91a.

Figure 3:
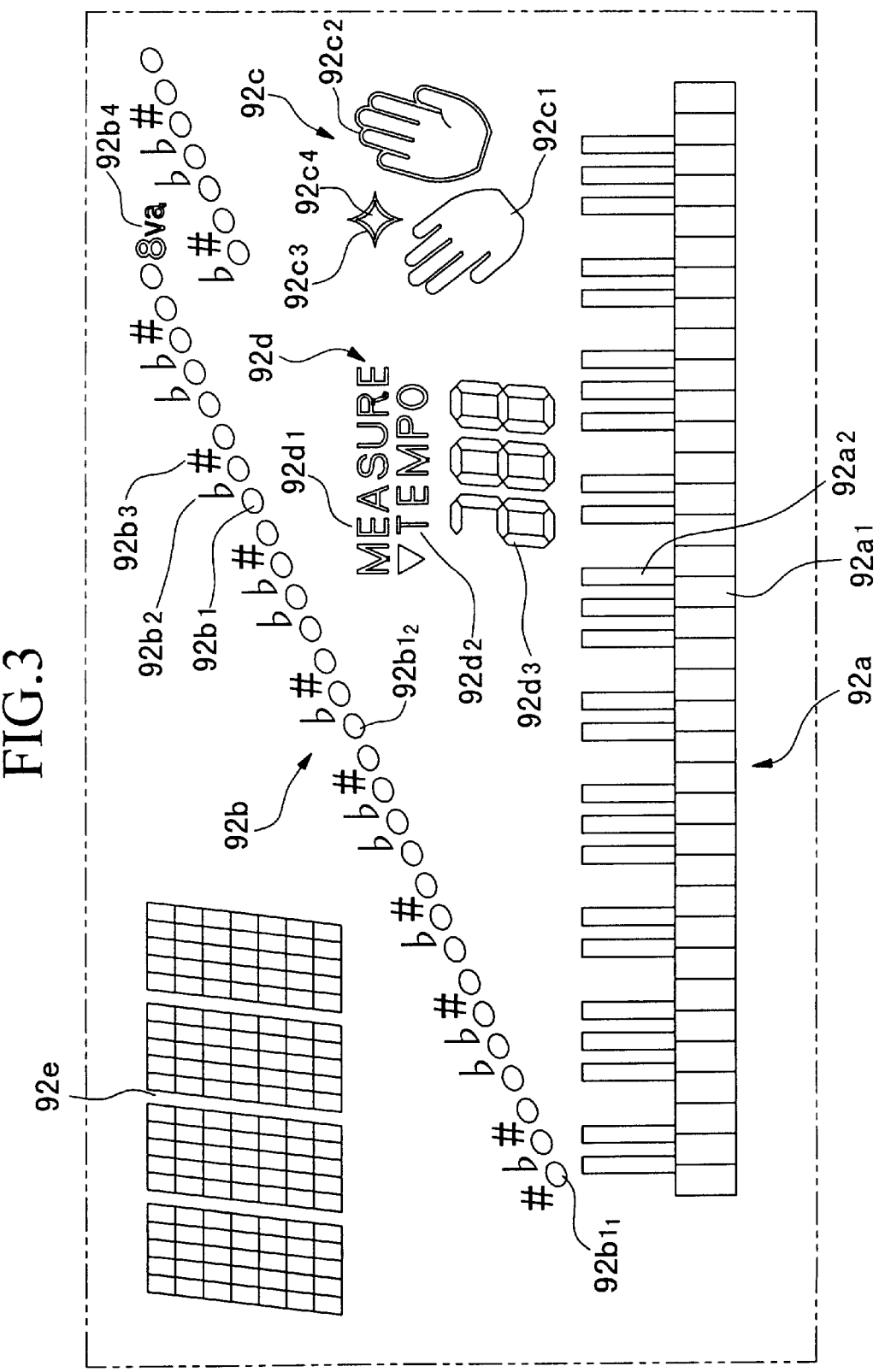
FIG. 3 is a schematic diagram showing an example of segments formed on a liquid crystal panel of the liquid crystal display.

FIG. 3 shows an example of the segments and outlines of the liquid crystal panel of the liquid crystal display 9. Herein, a reference symbol "92a" designates a keyboard segment portion which is formed in conformity with the keyboard print pattern 91a. The keyboard segment portion 92a consists of white key segments 92a1 and black key segments 92a2, which respectively correspond to the white keys and black keys. "92b" designates a note segment portion containing segments which are arranged in a slanted direction from the lower left to the upper right of the liquid crystal panel. The note segment portion 92b contains note segments 92b1 which are formed in conformity with the white key segments 92a1 of the keyboard segment portion 92a respectively and which are located above the white key segments 92a1 respectively. In addition, the note segment portion 92b contains flat sign segments 92b2 each showing a sign of flat, sharp sign segments 92b3 each showing a sign of sharp, and an octave display segment 92b4.

A reference symbol "92c" designates a beat display segment portion which is formed in conformity with the beat display print pattern 91d. The beat display segment portion 92c contains a hand back segment 92c1 diagrammatically showing an image of a back of a right hand and a hand palm segment 92c2 diagrammatically showing an image of a palm of a right hand. In addition, the beat display segment portion 92c contains a big star segment 92c3 and a small star segment 92c4. Further, "92d" designates a measure/tempo display segment portion, which shows a number of the measure presently played in the automatic performance as well as a tempo of the tune to be played. The measure/tempo display segment portion 92d contains a character pattern segment 92d1 showing seven alphabet characters of "MEASURE" and another character pattern segment 92d2 showing five alphabet characters of "TEMPO". In addition, the measure/tempo display segment portion 92d contains a numeric pattern segment 92d3, which is a seven-segment type display. Further, "92e" designates a matrix segment portion, which displays numbers, alphabet characters and other images.

The reflection panel of FIG. 2 and the liquid crystal panel of FIG. 3 are assembled together in such a way that dashed lines (or imaginary lines) shown in FIG. 2 and FIG. 3 match with each other. Thus, the white key segments 92a1 and black key segments 92a2 of the keyboard segment portion 92a match with areas surrounded by the boundary lines for the white keys and black keys of the keyboard print pattern 92a respectively. In addition, the hand back segment 92c1 of the beat display segment portion 92c partially overlaps with the beat display print pattern 91d. Further, the note segments 92b1 of the note segment portion 92bare respectively arranged on the lines or in the spaces with respect to the bass staff 91b and treble staff 91c. For example, a note segment 92b1, representing a lowest pitch note within the notes of the note segment portion 92b is located on a second ledger line 91b, which is printed below the bass staff 91b, while a note segment $92b1_2$ representing the middle C note is located on a first ledge line $91c_1$, which is printed below the treble staff 91c. In short, the note segments 92b1 of the note segment portion 92bcorrespond to note display positions, which are respectively arranged in a direction from the lower left to the upper right in the bass staff 91b and treble staff 91c.

The right end of the bass staff 91b is located in proximity to a right side of the note segment $92b1_2$ representing the middle C note, while the left end of the treble staff 91c is located in proximity to a left side of the note segment $92b1_2$. In short, the present embodiment is designed in such a way that the right end of the bass staff and the left end of the treble staff are located approximately in proximity to the center in the arrangement of the note display positions. In addition, the beat display segment portion 92c and the measure/tempo display segment portion 92d are located in an open area which is adjacent to and rightward from the bass staff 91b printed on the reflection plate of FIG. 2. Further, the matrix segment portion 92e is located in an open area which is adjacent to and leftward from the treble staff 91c printed on the reflection plate of FIG. 2.

The display circuit 9a applies electric voltage selectively to each of the segments of the liquid crystal panel. So, the segment to which the electric voltage is applied (hereinafter, simply referred to as a "display segment") is selectively placed in a darkened state. On the other hand, the segment to which the electric voltage is not applied and its surroundings are placed in a transparent state. That is, when the user watches the surface of the liquid crystal display 9, the user is capable of recognizing visually display images of dark colors in which the display segments overlap with the pictorial figures printed on the reflection plate.

Therefore, at the automatic performance mode, keys corresponding to note-on events are displayed by the keyboard segment portion 92a and the keyboard print pattern 91a. In addition, tone pitches corresponding to the note-on events are displayed by the note segment portion 92b in form of the notes displayed on the bass staff 91b and the treble staff 91c. In accordance with a progress of musical performance, beats are displayed by the beat display print pattern 91d and the beat display segment portion 92c.

Figure 1:
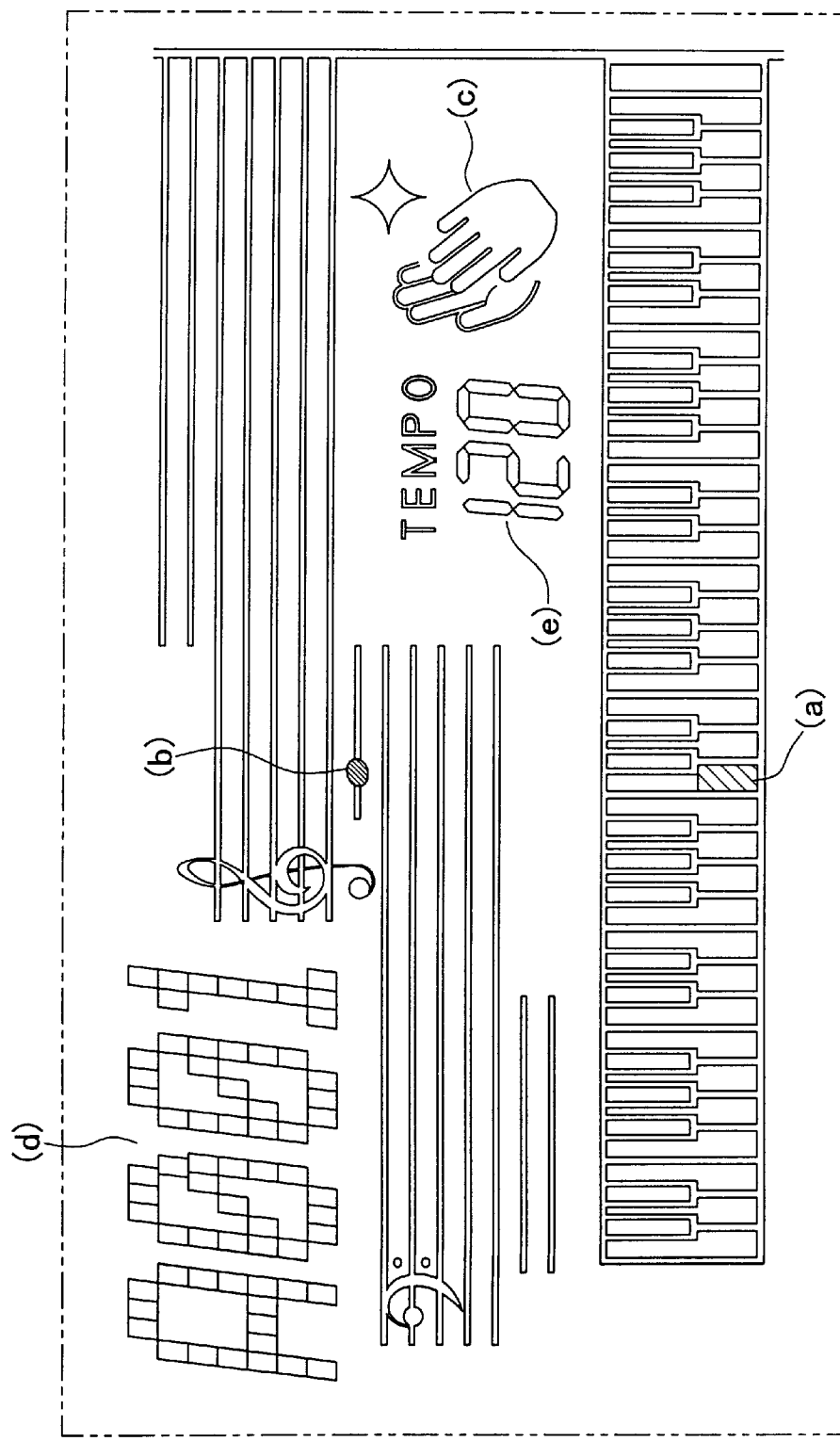
FIG. 1 shows an example of a display image for displaying notes and beats on a screen of a liquid crystal display.

FIG. 1 shows an example of manners to display notes and beats in accordance with the present embodiment. An display image of FIG. 1 is provided with respect to the case where in the automatic performance, the middle C note is subjected to note-on event. Herein, the electronic musical apparatus of the present embodiment displays one of the white key segments 92a1 which corresponds to the middle C note (see (a)). In addition, the electronic musical apparatus uses the note segment 92b1 to display a note corresponding to the middle C note on the first ledger line $91c_1$ of the treble staff 91c (see (b)). Further, the electronic musical apparatus uses the beat display print pattern 91d while activating the hand back segment 92c1 and the big star segment 92c3 of the beat display segment portion 92c to display timings of "strong (or intense)" beats (see (c)), for example. The electronic musical apparatus activates the matrix segment portion 92e to display a name of a tune, e.g., "A001" (see (d)). Furthermore, the electronic musical apparatus activates the measure/tempo display segment portion 92d to display a tempo, e.g., "120" (see (e)). At note-on events of the black keys, the electronic musical apparatus activates the note segments 92b1 as well as the flat sign segments 92b2 or the sharp sign segments 92b3 to display notes of the black keys.

Figure 9:
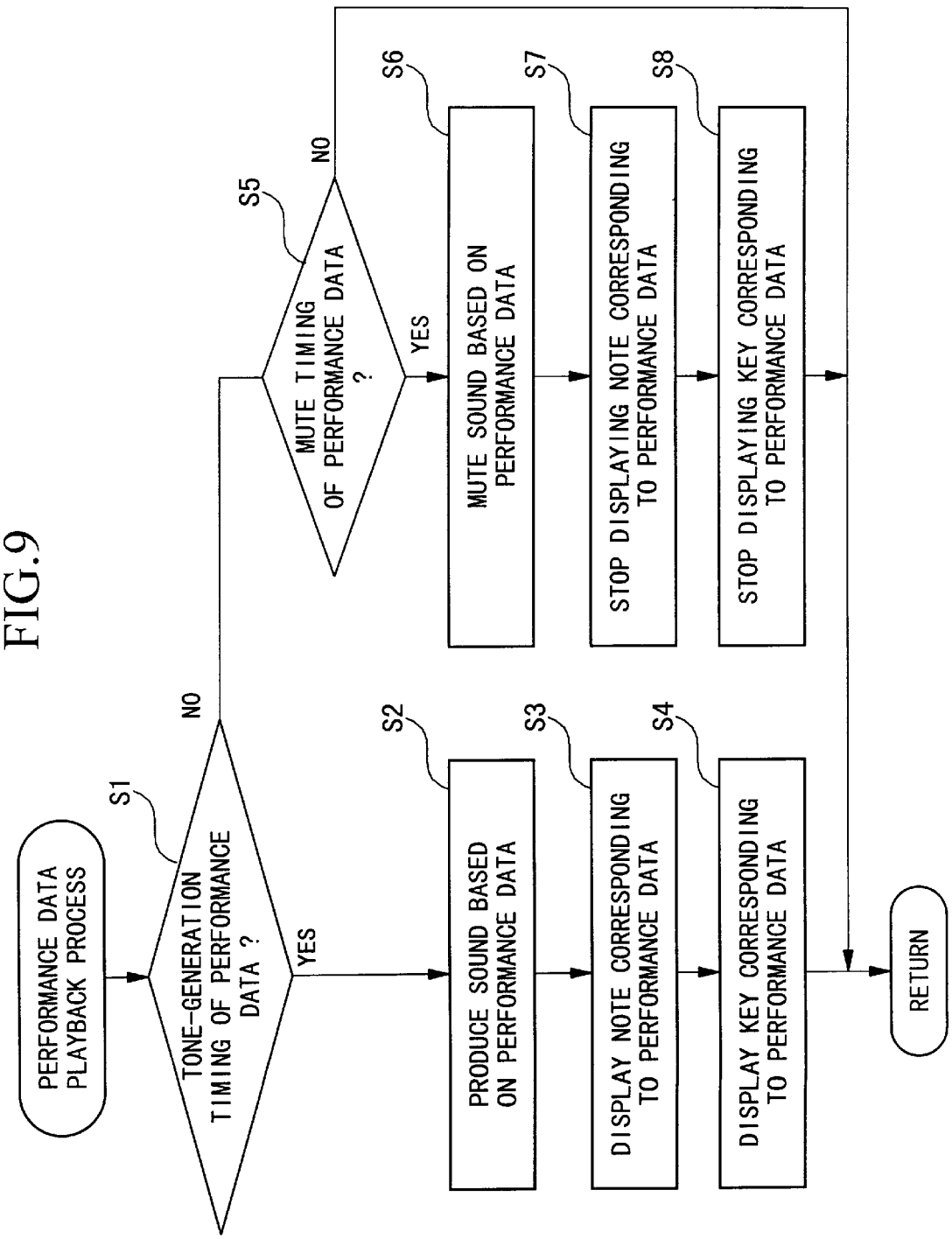
FIG. 9 is a flowchart showing a performance data playback process.
Figure 10:
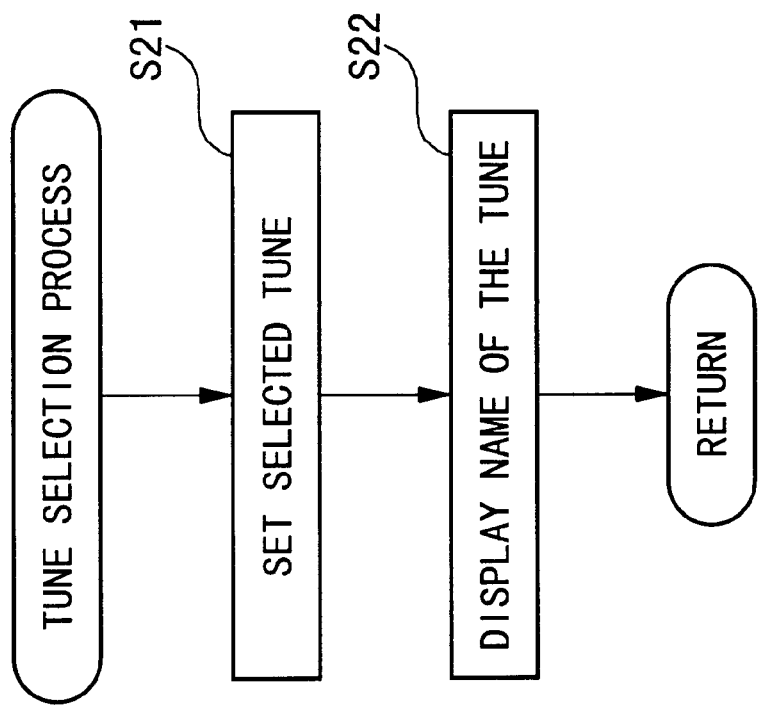
FIG. 10 is a flowchart showing a tune selection process.

FIG. 9 is a flowchart showing a playback process of performance data in accordance with the present embodiment. In addition, FIG. 10 is a flowchart showing a tune selection process, while FIG. 11 and FIG. 12 are flowcharts showing beat display processes, contents of which meet an example of a beat display program of this invention. Incidentally, the performance data playback process and beat display processes are all configured as subroutines which are called by interrupt processes to perform the automatic performance. Each of those processes are performed every prescribed timing based on the clock signal generated by the timer 10. For example, it is performed every eighth note. For further precise processing, it is performed every prescribed timing which correspond to one of ninety-nine time slots per quarter note, for example. Incidentally, the tune selection process of FIG. 10 is performed when the user operates some switch (or switches) to select the tune used for the automatic performance.

In step S1 of the performance data playback process of FIG. 9, a decision is made as to whether the present timing corresponds to the tone-generation timing or not. Herein, the decision of the step S1 is made based on timing data of the performance data. If the present timing is the tone-generation timing, the CPU 1 transfers control to step S2, wherein it performs a tone-generation process based on the performance data. In next step S3, the CPU 1 activates the note segment portion 92b to display a note corresponding to a note-on event in response to the performance data (i.e., pitch information). In step S4, the CPU 1 activates the keyboard segment portion 92a to display a key corresponding to the note-on event in response to the performance data. Thereafter, the CPU 1 reverts control to the original routine. If the step S1 determines that the present timing is not the tone-generation timing, the CPU 1 proceeds to step S5, wherein a decision is made as to whether the present timing corresponds to the mute timing or not. If the present timing is the mute timing, the CPU 1 transfers control to step S6, wherein it performs a muting process based on the performance data. In next step S7, the CPU 1 stops displaying the note corresponding to the performance data. In step S8, the CPU 1 stops displaying the key corresponding to the performance data. Then, the CPU 1 reverts control to the original routine. Incidentally, if the step S5 determines that the present timing is not the mute timing, the CPU 1 reverts control to the original routine. According to the contents of the performance data playback process described above, the electronic musical apparatus displays the notes in response to the automatic performance.

In the tune selection process of FIG. 10, the CPU 1 firstly proceeds to step S21, wherein performance data corresponding to a tune which is presently selected are set to the electronic musical apparatus for the automatic performance. In step S22, the CPU 1 activates the matrix segment portion 92e to display a name of the selected tune. Thereafter, the CPU 1 reverts control to the original routine.

Figure 4:
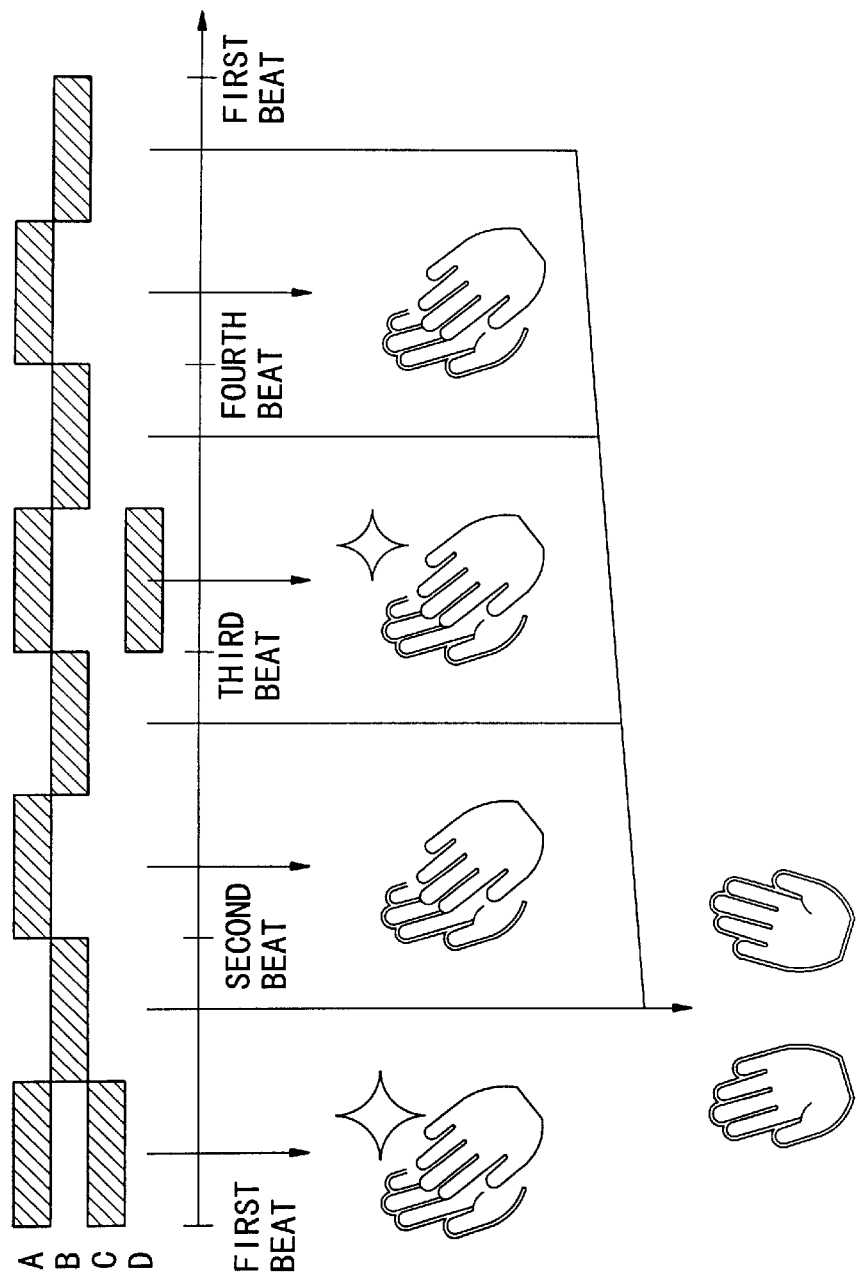
FIG. 4 is a time chart showing a first beat display pattern.
Figure 5:
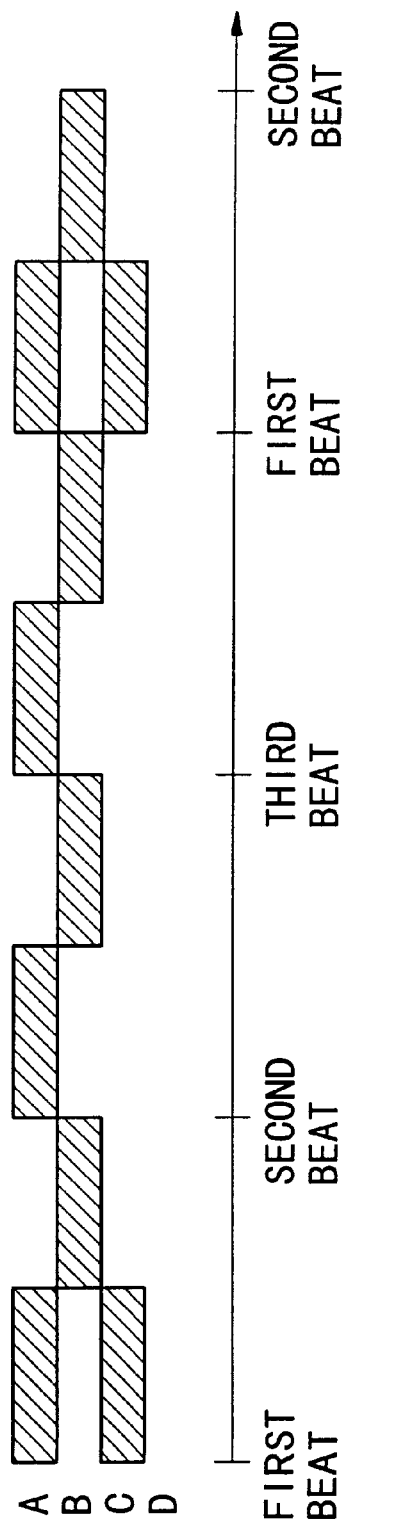
FIG. 5 is a time chart showing a second beat display pattern.
Figure 6:
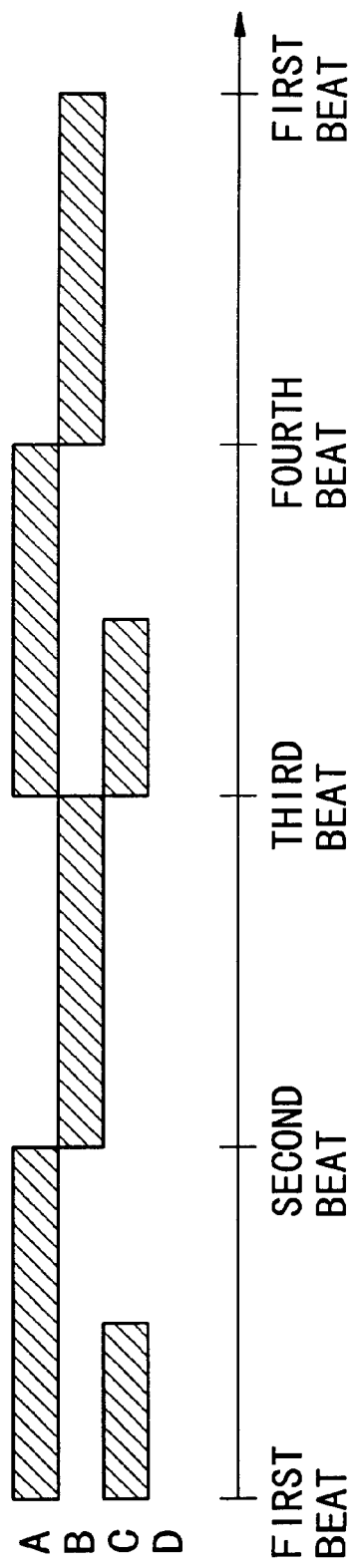
FIG. 6 is a time chart showing a third beat display pattern.
Figure 7:
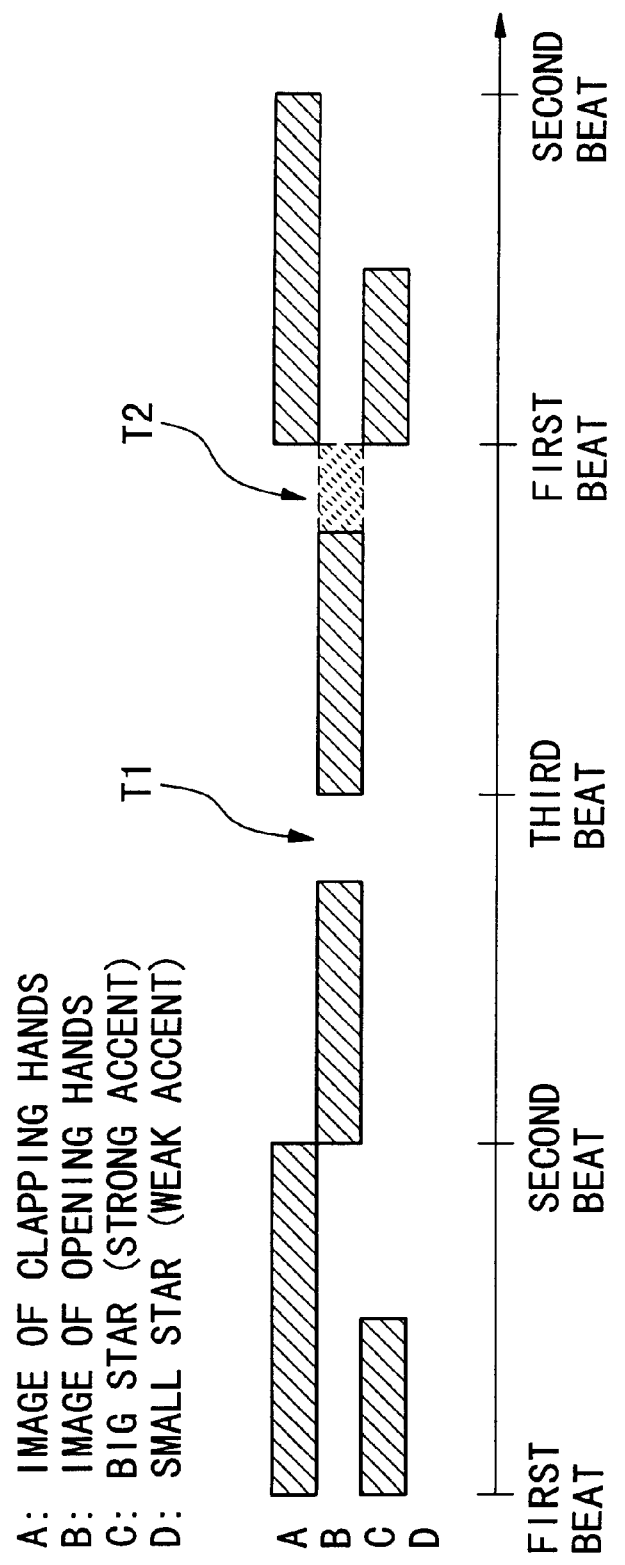
FIG. 7 is a time chart showing a fourth beat display pattern.

Next, a description will be given with respect to beat display processes of the present embodiment. For convenience'sake, the present embodiment describes four kinds of beat display patterns, which contain two kinds of beat display patterns used for 4/4 time and two kinds of beat display patterns used for 3/4 time. Time charts of FIG. 4 to FIG. 7 are provided for explanation of the beat display processes. Specifically, FIG. 4 shows a first beat display pattern in 4/4 time; FIG. 5 shows a second beat display pattern in 3/4 time; FIG. 6 shows a third beat display pattern in 4/4 time; and FIG. 7 shows a fourth beat display pattern in 3/4 time. Incidentally, for simplification of the Figures, processes used for the two kinds of beat display patterns are shown by the same flowcharts of FIG. 11 and FIG. 12 respectively. Specifically, the flowchart of FIG. 11 is provided for explanation of the first and second beat display patterns, while the flowchart of FIG. 12 is provided for explanation of the third and fourth beat display patterns. In steps S31 and S41 shown in FIG. 11 and FIG. 12 respectively, a reference numeral "(4)" designates a case of 4/4 time (corresponding to the first or third beat display pattern), while a reference numeral "(3)" designates a case of 3/4 time (corresponding to the second or fourth beat display pattern).

In the time charts of FIG. 4 to FIG. 7, time blocks with hatching are written with respect to reference symbols "A" to "D" respectively. Herein, the time blocks written for "A" designate times that the CPU 1 activates the aforementioned hand back segment 92c1 (hereinafter, simply referred to as a "segment A") to display an image of the back of the right hand on the screen of the liquid crystal display. That is, the segment A is displayed with being overlapped with the beat display print pattern 91d, so that the electronic musical apparatus of the present embodiment shows an image of clapping hands. The time blocks written for "B" designate times that the CPU 1 activates the hand palm segment 92c2 (hereinafter, simply referred to as a "segment B") to display an image of the palm of the right hand on the screen of the liquid crystal display. That is, the segment B is displayed with being overlapped with the beat display print pattern 91d, so that the electronic musical apparatus displays an image of opening hands. Time blocks written for "C" designate times that the CPU 1 activates the big star segment 92c3 (hereinafter, simply referred to as a "segment C") to display an image of a big star on the screen of the liquid crystal display. That is, the electronic musical apparatus uses the segment C to display the image of the big star in response to a strong accent. The time blocks written for "D" designate times that the CPU 1 activates the small star segment 92c4 (hereinafter, simply referred to as a "segment D") to display an image of a small star on the screen of the liquid crystal display. That is, the electronic musical apparatus uses the segment D to display the image of the small star in response to a weak accent. Incidentally, spaces between the time blocks designate times that the CPU 1 stops activating the segments A to D not to display their images on the screen of the liquid crystal display.

The present embodiment uses a beat counter (not shown) which counts a number of beats in accordance with a progress in playback of the performance data. In step S31, the CPU 1 determines a number of a beat presently made on the basis of an output of the beat counter. In response to prescribed beats in each of the beat display patterns (where the first beat display pattern is denoted by the reference numeral "(4)" while the second beat display pattern is denoted by the reference numeral "(3)" in step S31 shown in FIG. 11), the CPU 1 performs changeovers in displays of the segments A to D in steps S32 to S35 respectively. The flowchart of FIG. 12 is configured as similar to the aforementioned flowchart of FIG. 11. That is, in step S41, the CPU 1 determines the number of the beat based on the beat counter. In response to prescribed beats in each of the beat display patterns (where the third beat display pattern is denoted by "(4)" while the fourth beat display pattern is denoted by "(3)" in step S41 shown in FIG. 12), the CPU 1 performs changeovers in displays of the segments A to D in step S42 to S45 respectively. Thus, as for the first beat display pattern, for example, the electronic musical apparatus performs beat display in accordance with a progress of beats by combinations of the image of clapping hands and image of opening hands as well as the big and small stars in accordance with a sequence shown in FIG. 4. That is, the electronic musical apparatus displays the image of clapping hands in response to front beats (or down-beats) while it displays the image of opening hands in response to back beats (or up-beats). At a first beat of strong accent in 4/4 time (see FIG. 4), the electronic musical apparatus displays the big star. At a third beat of weak accent, it displays the small star. Like the aforementioned first beat display pattern, the second to fourth beat display patterns are formed directly in accordance with the time charts as well as the sequence of FIG. 4, so the detailed description thereof will be omitted. In the second beat display pattern which is similar to the first beat display pattern, the electronic musical apparatus displays the image of clapping hands at the front beats while it displays the image of opening hands at the back beats. In the third and fourth beat display patterns, the electronic musical apparatus alternatively displays the image of clapping hands and image of opening hands, which are changed over by each of the beats.

In the fourth beat display pattern shown in FIG. 7, the electronic musical apparatus momentarily deactivates the segment B to stop displaying the image of opening hands in a time space T1, which corresponds to a latter part of the duration of the second beat before the duration of the third beat in 3/4 time. This enables the user to recognize the timing of the third beat with ease. The same operation to momentarily stop displaying the image of opening hands can be applied to another time space T2 which corresponds to a latter part of the duration of the third beat before the duration of the first beat of the next measure. However, the display images used for indication of the first beat differs from the display image used for indication of the third beat. So, it is not always necessary to perform such operation in the time space T2, which is shown by a block of dotted line with hatching.

The present embodiment employs a display layout, in which the beat display position (see (c) in FIG. 1) is located to be adjacent to and rightward from the bass staff. However, this invention is not limited to such a display layout. So, the beat display position can be set in an arbitrarily selected area on the screen of the liquid crystal display.

According to the display layout for the liquid crystal display employed by the present embodiment, the name of the tune is displayed on the area which is leftward from the treble staff, while the beats, tempo and measures are displayed on the area which is rightward from the bass staff. So, those areas are used as display spaces for displaying musical elements other than the musical notes.

In addition, the present embodiment uses pictorial figures of hands for the beat display. So, as compared with the conventional electronic musical apparatus which employs LEDs for the beat display, the present embodiment is capable of offering an advantage that the user is capable of recognizing the beat display with ease.

Further, the present embodiment is designed such that the left portion of the treble staff and the right portion of the bass staff are located in proximity to the center area of the screen of the liquid crystal display. Thus, the present embodiment is capable of securing the display spaces for displaying the beats, name of the tune and the like. Incidentally, it is possible to modify the present embodiment such that either the leftward area of the treble staff or the rightward area of the bass staff is used as the display space for displaying the other musical elements other than the notes. In that case, it is possible to use the overall display space of the screen of the liquid crystal display in a further effective way as compared with the conventional technology.

The present embodiment describes the liquid crystal display 9 as of a reflection type, which is constructed using the reflection plate. However, it is possible to use another type of the liquid crystal display such as a selflighting type equipped with back lighting. In addition, the present embodiment describes the liquid crystal display as one constructed using the liquid crystal panel and reflection plate, wherein the segments of the prescribed shapes are formed on the liquid crystal panel while the treble staff and bass staff are printed on the reflection plate. The application of this invention is not necessarily limited to such static display in which the staffs are printed. For example, it is possible to use other types of displays such as the liquid crystal display of the dot matrix type and the CRT display, in which pictures or images can be arbitrarily displayed on the screen based on the picture data arbitrarily set. In other words, this invention can be applied to the dynamic display in which pictures of the staffs are dynamically displayed on the screen.

In the aforementioned case, programs recorded on some media contain the step for processing display of staffs as well as the step for processing display of notes as similar to the processing of the embodiment.

Incidentally, it is possible to use any one of the known formats for the performance data applicable to this invention. For example, examples of the formats of the performance data applicable to this invention are as follows:

(1) Format of "(event)+(relative time)", wherein the occurrence time of the performance event is designated by the time that elapses from the preceding performance event;

(2) Format of "(event)+(absolute time)", wherein the occurrence time of the performance event is designated by the absolute time which is set in the tune or measure;

(3) Format of "(pitch or rest)+(note length)", wherein the performance data are designated by the pitch of the note plus note length or by the rest plus rest length; and (4) Format of a so-called "solid method", wherein a memory area is secured every minimal resolution of the performance, so that the performance event is stored in the memory area corresponding to the occurrence time of the performance event.

The present embodiment is designed to use the ROM 2 which stores the control programs such as the note display program and beat display program in advance. However, storage of the programs applicable to this invention is not necessarily limited to the ROM. For example, the present embodiment can be modified as follows:

The aforementioned control programs (i.e., the note display program and/or the beat display program) are recorded on the CD-ROM, so that the CD-ROM drive transfers the control programs to the hard disk(s). Then, the CPU 1 transfers the control programs from the CD-ROM to run them on the RAM 3. So, the CPU 1 controls operations for the note display and beat display based on the control programs. Thus, the CPU 1 is capable of performing the operations which are similar to those of the foregoing embodiment that uses the ROM 2 to store the control programs.

According to the above modification, it is possible to newly install the control programs with ease. In addition, it is possible to add or change the control programs to cope with the version-up event. Incidentally, it is possible to use other storage devices for storing the control programs other than the aforementioned CD-ROM. That is, it is possible to store the control programs on the floppy disk(s) and magneto-optic disk, from which the control programs are transferred to the hard disk(s) or the RAM 3.

As shown in FIG. 8, the electronic musical apparatus uses a communication interface 13 to down-load the control programs thereto. In this case, the electronic musical apparatuses uses the communication interface 13 to link with a communication network 30 such as the LAN (i.e., Local Area Network), Internet and telephone lines. By means of the communication network 30, the electronic musical apparatus is capable of receiving the control programs which are distributed from a server computer 40. So, the electronic musical apparatus stores the distributed control programs on the hard disk(s) to complete the down-loading.

Application of this invention is not limited to the foregoing embodiment corresponding to the electronic musical apparatus of the keyboard type. That is, this invention can be applied to the system, wherein devices such as the sound source device, sequencer and effecter are externally provided and are connected together using the MIDI interface or communication interface for networks, for example. In addition, application of this invention is not limited to the foregoing embodiment that is designed to perform the note display and beat display in accordance with the automatic performance for automatically generating musical tones. For example, this invention is applicable to the music training machine equipped with the visual display by which the user makes practices in music by watching the notes and beats which are displayed, regardless of the automatic performance. Further, this invention is applicable to the karaoke device in which the notes and beats are displayed in accordance with the melody of the tune.

As described heretofore, the present embodiment is described with respect to the limited application of this invention which is applied to the electronic musical apparatus. However, the note display method and/or beat display method of this invention can be actualized by the personal computer and its application software programs, for example.

When this invention is applied to the personal computer, the CPU of the personal computer performs controls using the working area(s) of the RAM based on the OS (i.e., Operating System) installed on the hard disk(s), for example. In this case, the personal computer can be controlled to operate as similar to the aforementioned embodiment. That is, the performance data and control programs given from the external storage device are transferred to the hard disk(s) as the application software programs, so that the CPU performs the foregoing operations of the embodiment. The personal computer is capable of handling selection of the performance data and the like with ease by the data input process in which the data input is made in response to manipulation of the keyboard and/or the mouse. Incidentally, it is possible to supply the personal computer with the control programs and data from the network.

As the media storing the note display program and/or the beat display program, it is possible to use the ROM, RAM, hard disk unit, CD-ROM, magneto-optic disk and DVD (or digital multipurpose disk), for example. In addition, as the storage device corresponding to the distribution destination of the programs and data from the server computer via the communication network, it is possible to use the known devices and media described above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A method for effectively displaying musical information on an electronic musical apparatus, comprising the steps of:

displaying a bass staff and a treble staff on a screen of a visual display such that the bass staff is displayed at a lower left area on the screen while the treble staff is displayed at an upper right area on the screen;

arranging note display positions on the bass staff and the treble staff respectively in a direction from lower left to upper right on the screen;

sequentially displaying notes at the note display positions on the bass staff and the treble staff respectively in accordance with a progress of a tune to be played in response to a keyboard of the musical instrument; and displaying musical information other than the notes in either a right-side area of the bass staff or a left-side area of the treble staff, wherein at least one of a right end of the bass staff and a left end of the treble staff is located approximately in proximity to a center in arrangement of the note display positions and wherin said musical information other than the notes relates to said tune to be played.

2. A method for effectively displaying musical information on the electronic musical apparatus according to claim 1 wherein the notes are sequentially displayed on the bass staff and the treble staff respectively in response to performance data which are stored in advance and are played back, and wherein the musical information other than the notes correspond to at least one of a name of a tune of the performance data, a playback tempo of the performance data being played back and beats of the performance data being played back.

3. A method for effectively displaying musical information on an electronic musical apparatus which is equipped with a visual display having a first hand segment representing an image of a palm of a first hand, a second hand segment representing an image of a palm of a second hand and a hand back segment representing an image of a back of the second hand, said method comprising the steps of:

displaying the first hand segment and the hand back segment while being slightly shifted in display positions so as to display a first beat with respect to each of the measures of a tune to be played; and displaying the first hand segment and the second hand segment while being apart from each other in display positions so as to display a second beat in each of the measures of the tune, wherein the first beat and the second beat are alternatively and repeatedly displayed so that beats of the tune are sequentially displayed.

4. A method for effectively displaying musical information on the electronic musical apparatus according to claim 3 further providing an accent display segment, which is displayed together with the first beat.

5. An electronic musical apparatus for effectively displaying musical information thereon, comprising:

a processor which executes a musical process in response to musical information; and a visual display which displays a bass staff and a treble staff on a screen in accordance with an instruction by the processor such that the bass staff is displayed at a lower left area on the screen while the treble staff is displayed at an upper right area on the screen, wherein said musical process includes the steps of:
sequentially displaying notes at note display positions on the bass staff and the treble staff respectively in accordance with a progress of a tune to be played in response to a keyboard, wherein the note display positions are arranged on the bass staff and the treble staff respectively in a direction from lower left to upper right on the screen; and
displaying the musical information other than the notes in either a right-side area of the bass staff or a left-side area of the treble staff,
wherein at least one of a right end of the bass staff and a left end of the treble staff is located approximately in proximity to a center in arrangement of the note display positions and wherein said musical information other than the notes relates to said tune to be played.

6. An electronic musical apparatus for effectively displaying musical information thereon, comprising:
a processor which executes a musical process in response to musical information; and
a visual display having a first hand segment representing an image of a palm of a first hand, a second hand segment representing an image of a palm of a second hand and a hand back segment representing an image of a back of the second hand,
wherein said musical process includes the steps of:
displaying the first hand segment and the hand back segment while being slightly shifted in display positions so as to display a first beat with respect to each of the measures of a tune to be played; and
displaying the first hand segment and the second hand segment while being apart from each other in display positions so as to display a second beat in each of the measures of the tune,
wherein the first beat and the second beat are alternatively and repeatedly displayed so that beats of the tune are sequentially displayed.

7. A machine-readable media storing a musical information display program that causes a computer to perform a musical information display method comprising the steps of:
displaying a bass staff and a treble staff on a screen of a visual display such that the bass staff is displayed at a lower left area on the screen while the treble staff is displayed at an upper right area on the screen;
arranging note display positions on the bass staff and the treble staff respectively in a direction from lower left to upper right on the screen;
sequentially displaying notes at the note display positions on the bass staff and the treble staff respectively in accordance with a progress of a tune to be played in response to a keyboard of the musical instrument; and
displaying musical information other than the notes in either a right-side area of the bass staff or a left-side area of the treble staff,
wherein at least one of a right end of the bass staff and a left end of the treble staff is located approximately in proximity to a center in arrangement of the note display positions and wherein said musical information other than the notes relates to said tune to be played.

8. A machine-readable media storing a program that causes a computer to perform a method for effectively displaying musical information on an electronic musical apparatus which is equipped with a visual display having a first hand segment representing an image of a palm of a first hand, a second hand segment representing an image of a palm of a second hand and a hand back segment representing an image of a back of the second hand, said method comprising the steps of:
displaying the first hand segment and the hand back segment while being slightly shifted in display positions so as to display a first beat with respect to each of the measures of a tune to be played; and
displaying the first hand segment and the second hand segment while being apart from each other in display positions so as to display a second beat in each of the measures of the tune,
wherein the first beat and the second beat are alternatively and repeatedly displayed so that beats of the tune are sequentially displayed.

9. An electronic musical apparatus for effectively displaying musical information thereon, comprising:
a keyboard;
a processor which executes a musical process in response to musical information; and
a visual display which displays a keyboard pattern representing an image of the keyboard as well as a bass staff and a treble staff on a screen, wherein the keyboard pattern consisting of white keys and black keys is displayed at a lower base area of the screen while the bass staff is displayed at a lower left area of the screen and the treble staff is displayed at an upper right area of the screen, and wherein a right end of the bass staff and a left end of the treble staff are located approximately in proximity to a center of the keyboard pattern which corresponds to a key of middle C note in a horizontal direction on the screen,
wherein said musical process includes the steps of:
displaying keys of the keyboard pattern to show a progression of notes of a tune to be played based on performance data corresponding to the musical information;
sequentially displaying the notes of the tune on the bass staff and the treble staff, wherein notes are displayed in accordance with note display positions which are disposed from a lower left to an upper right to conform with the bass staff and the treble staff respectively on the screen; and
displaying timings of beats of the tune by using images of hands which are displayed at a predetermined area on the screen.

10. An electronic musical apparatus according to claim 9, wherein the visual display is configured by a liquid crystal display consisting of a liquid crystal panel containing segments and a reflection plate containing print patterns.

11. An electronic musical apparatus according to claim 10, wherein the print patterns correspond to boundary lines of the keyboard pattern as well as the bass staff and the treble staff respectively, while the segments correspond to the white keys and black keys as well as the note display positions and the images of the hands respectively.

12. An electronic musical apparatus according to claim 9, wherein the images of the hands are displayed alternatively such as to show an image of clapping hands or an image of opening hands.

13. An electronic musical apparatus according to claim 9, wherein the images of the hands are changed in response to a beat display pattern which is determined with respect to time of the tune.

14. An electronic musical apparatus according to claim 9, wherein said musical process further comprises the step of:

further displaying an image of a star to represent a strong accent or a weak accent.

15. An electronic musical apparatus according to claim 9 further comprising a storage device for storing the performance data, so that the performance data are read from the storage device to provide automatic performance.

16. An electronic musical apparatus according to claim 9, wherein the performance data are configured by pitch information and timing data, so that the keys and the notes are displayed based on the pitch information while the timings of the beats are displayed based on the timing data.

* * * * *